(12) United States Patent
Fux et al.

(10) Patent No.: US 6,805,543 B2
(45) Date of Patent: Oct. 19, 2004

(54) NOZZLE ARRANGEMENT, NOZZLE CARRIER AND DEVICE FOR EXTRUDING DOUGHY SUBSTANCES

(75) Inventors: Günther Fux, Güglingen (DE); Frank Altvater, Heilbronn (DE)

(73) Assignee: Hosokawa Bepex GmbH, Leingarten (DE)

( * ) Notice: Subject to any disclaimer, the term of this patent is extended or adjusted under 35 U.S.C. 154(b) by 303 days.

(21) Appl. No.: 10/062,201

(22) Filed: Feb. 1, 2002

(65) Prior Publication Data

US 2002/0086096 A1 Jul. 4, 2002

Related U.S. Application Data

(63) Continuation of application No. PCT/EP00/07554, filed on Aug. 3, 2000.

(30) Foreign Application Priority Data

Aug. 5, 1999 (DE) .......................... 199 36 829

(51) Int. Cl.[7] .................. B29C 47/24; B29C 47/30
(52) U.S. Cl. .................. 425/133.1; 425/192 R; 425/381; 425/382 R; 425/382.3; 425/466; 425/319
(58) Field of Search .................. 425/133.1, 131.1, 425/192 R, 381, 381.2, 382 R, 463, 382.3, 382.4, 466, 467, 468, 319, 462, 190; 426/516, 517

(56) References Cited

U.S. PATENT DOCUMENTS

| | | | |
|---|---|---|---|
| 3,694,292 A | * | 9/1972 | Schippers et al. .......... 156/501 |
| 3,752,632 A | * | 8/1973 | Heesen ...................... 425/331 |
| 3,940,226 A | * | 2/1976 | Verhoeven .................. 425/375 |
| 4,208,178 A | * | 6/1980 | Przytulla .................... 425/467 |
| 4,288,463 A | * | 9/1981 | Groff et al. ................ 426/500 |
| 4,906,171 A | * | 3/1990 | Miller ..................... 425/131.1 |
| 5,120,554 A | | 6/1992 | Farnsworth et al. ........ 426/282 |
| 5,518,749 A | | 5/1996 | Weinstein ................... 426/500 |
| 5,609,903 A | | 3/1997 | Israel et al. ................ 426/500 |
| 5,620,713 A | * | 4/1997 | Rasmussen ............... 425/131.1 |
| 5,637,341 A | * | 6/1997 | Rivlin ....................... 426/496 |
| 5,834,040 A | * | 11/1998 | Israel et al. ................ 425/381 |
| 6,428,830 B1 | * | 8/2002 | Matthews et al. ........... 426/92 |
| 6,450,796 B1 | * | 9/2002 | Groff et al. ............. 425/192 R |
| 2002/0084281 A1 | * | 7/2002 | Horna et al. ................... 222/1 |

FOREIGN PATENT DOCUMENTS

| | | |
|---|---|---|
| DE | PS452211 | 11/1927 |
| EP | 0044689 A1 | 1/1982 |
| EP | 0168255 A2 | 1/1986 |
| EP | 0177175 A2 | 4/1986 |
| EP | 0202143 A2 | 11/1986 |
| EP | 0 287 209 A2 * | 10/1988 |
| EP | 0 434 983 A1 * | 7/1991 |
| EP | 0704158 A1 | 4/1996 |
| EP | 0876896 A1 | 11/1998 |
| EP | 1036500 A1 | 9/2000 |
| FR | 847554 | 10/1939 |
| WO | WO 9303909 | 3/1993 |
| WO | WO 9725881 | 7/1997 |

* cited by examiner

*Primary Examiner*—Robert Davis
*Assistant Examiner*—Joseph Del Sole
(74) *Attorney, Agent, or Firm*—Clifford W. Browning; Woodard, Emhardt, Moriarty, McNett & Henry LLP

(57) ABSTRACT

For producing coiled bakery products, a nozzle arrangement (10) comprises an inner nozzle (14), which is disposed coaxially with an axis of rotation (26), and an outer nozzle (18, 19), which is disposed axially offset relative to said inner nozzle (14), wherein the outer nozzle (14) is rotatable about the axis of rotation (26).

9 Claims, 3 Drawing Sheets

Figure 1:
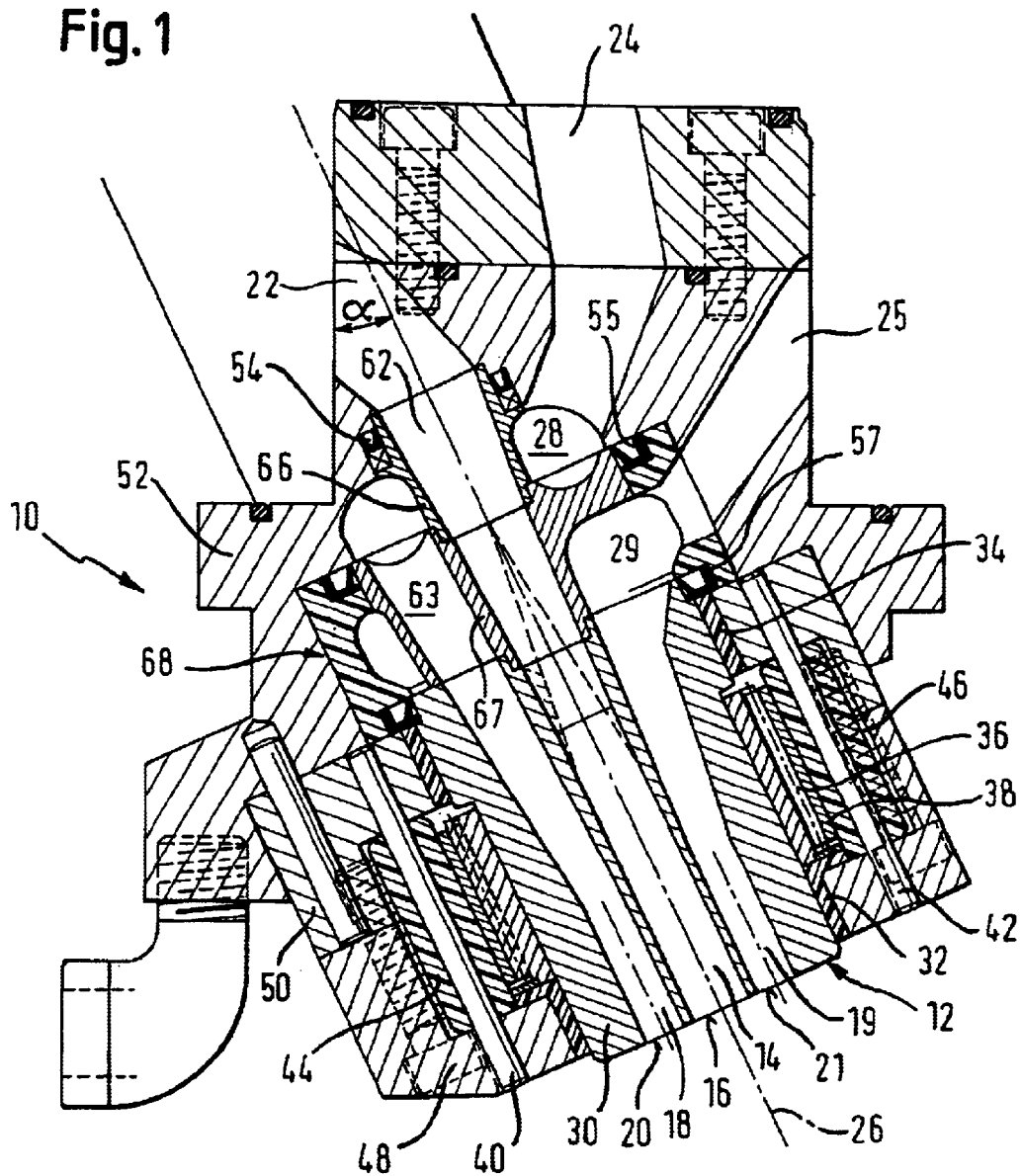

NOZZLE ARRANGEMENT, NOZZLE CARRIER AND DEVICE FOR EXTRUDING DOUGHY SUBSTANCES

This application is a continuation of PCT/EP00/07554 filed Aug. 3, 2000.

BACKGROUND OF THE INVENTION

Bakery products, pastries and confectionery are often extruded by forcing a substance placed under pressure through a nozzle arrangement to form a strand. The strand as such may be carried away by a conveyor belt or it may be divided into short portions. The external shape, in particular the peripheral shape of the strand is dependent upon the nozzle arrangement.

From EP-A-0 704 158 a nozzle arrangement is known, which comprises an inner stationary nozzle as well as a middle and an outer nozzle, which are disposed coaxially and of which the last two are jointly rotatable. Such a nozzle arrangement is used to produce dough strands of differing cross-sectional shape, which each comprise an inner filling surrounded by two layers of dough.

From DE-A-452 211 a bread plaiting machine is known, in which three plaiting die rings deliver between two rotating drivers and are therefore interwoven along a path in the shape of a figure eight. With such a machine it is not possible to produce dough products having a filling because the filling would have to be supplied in the delivery region of the plaiting die rings between the drivers.

From EP-A-0 168 255 and EP-A-0 177 175 A2 devices for co-extruding two substances are known, which extrude an inner substance through a nozzle and an outer substance containing granular particles through a hopper surrounding the nozzle, wherein the substances are combined to form a strand. The hopper at its mouth has sharp edges so that the granular particles in the outer substance may pass onto the surface. The mouth of the hopper may be of a toothed design so that the particles also project from the surface. The composite strand is carried away by a conveyor belt. By said means it is possible to produce from two substances a bakery product, which has a rectilinear elongate shape and has granular particles at the surface.

From EP-A-0 202 143 a triple extruder is known, by means of which an inner substance is coated with a first outer substance, and the latter is coated with a second outer substance. The inner substance is fed through a middle feed channel to an inner nozzle. An outer nozzle surrounds the inner nozzle and is supplied with the first outer substance through a lateral feed channel. A hopper surrounds the outer nozzle. The second outer substance is supplied through the hopper. The outer nozzle and the hopper each form an annular space around the inner nozzle. In longitudinal section, said annular spaces have an angular shape. With such a triple extruder it is possible to produce a likewise elongate, externally rectilinear bakery product.

U.S. Pat. No. 5,120,554 describes a stand-alone nozzle head for extruding a doughy substance. The nozzle head at its periphery has a plurality of nozzle arrangements. The nozzle arrangements are formed in each case by a double nozzle for manufacturing filled bakery products. Said double nozzles each have an inner nozzle, which is supplied through an individual feed channel, and an outer nozzle. The outer nozzles are supplied via a common cylindrical feed chamber through lateral channels. The nozzle head enables simultaneous extrusion of a plurality of filled, straight strands.

From U.S. Pat. No. 5,518,749 and WO 97/25881 a method and a device for manufacturing twisted cereal products are known. A rotor, which extends through a chamber and runs into an opening of the chamber, forms an inner nozzle, through which an inner substance is feedable. A second substance is feedable through a lateral channel into the chamber. Between the opening of the chamber and the rotor there is an annular gap, through which the second substance may exit. The annular gap corresponds to an outer nozzle. When the inner nozzle rotates, a product having a twisted outer substance layer and a filling is produced. In said case, however, the twisting of the outer substance layer is highly dependent upon the properties of the outer substance, such as its flow behaviour and viscosity. The extruded cereal products therefore do not always have a sufficiently uniform shape.

SUMMARY OF THE INVENTION

The object of the invention is to provide a nozzle arrangement, a nozzle carrier and a device for extruding doughy substances, with which it is possible with a high degree of accuracy as regards weight and shape to manufacture twisted or coiled bakery and confectionery products, in which individual coiled outer strands are formed around a rectilinear middle strand.

The object is achieved according to the invention by a nozzle arrangement comprising an inner nozzle, which is disposed coaxially with an axis of rotation and has a mouth for extruding an inner substance, and at least one outer nozzle, which is rotatable about the axis of rotation and has a mouth for extruding at least one outer substance. The outer nozzle is in said case axially offset relative to the inner nozzle or disposed at a distance from the inner nozzle. It is advantageous when the inner nozzle is also rotatable about the axis of rotation. With such a nozzle arrangement it is possible to produce a bakery product comprising a middle strand, around which outer strands are coiled.

The shape and number of the outer strands are variable within a wide range by means of the shape and number of outer nozzles. A regular shape arises when a plurality of outer nozzles, through which a plurality of outer substances are feedable, are arranged distributed at regular intervals on the periphery of the inner nozzle.

According to the present invention, in longitudinal section the annular spaces formed in the nozzle carriers are in sections circular or elliptical in shape. The substance flowing into or out of the annular space or inside the annular space is therefore prevented from flowing over more or less sharp edges, which would generate turbulence in the substance. The annular spaces moreover serve as pressure compensation spaces so that it is possible to allow the substances to flow uniformly out of the mouths of the outer nozzles, and bakery products of a precisely identical outer shape and of an identical weight are obtained.

By virtue of the developments according to the present invention the nozzle carrier may be adapted to attributes of the viscous substance, such as flow volume or viscosity, by simply exchanging interchangeable parts.

For driving the nozzle carrier, a traction mechanism gearing in particular a toothed belt drive, or a toothed gearing with intersecting axes is provided, wherein in a special configuration a plurality of nozzle carriers are drivable simultaneously.

A preferred embodiment of the invention provides that the nozzle carrier(s) is (are) disposed so as to be inclined at an angle α of around 25° to the vertical. By virtue of the inclined nozzle carrier the emerging substance encounters a support, e.g. a conveyor belt, obliquely and is therefore, as it is moved away, deformed less than would be the case if it emerged vertically.

BRIEF DESCRIPTION OF THE DRAWING FIGURES

Figure 2:
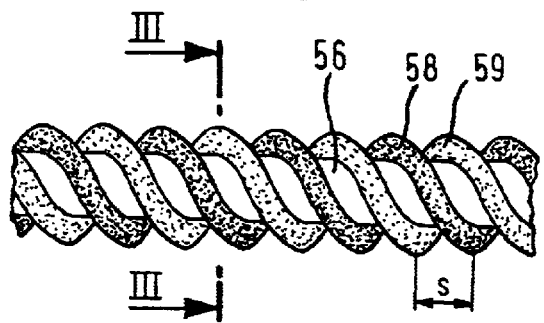
Figure 3:
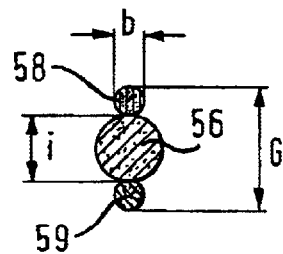
Figure 4:
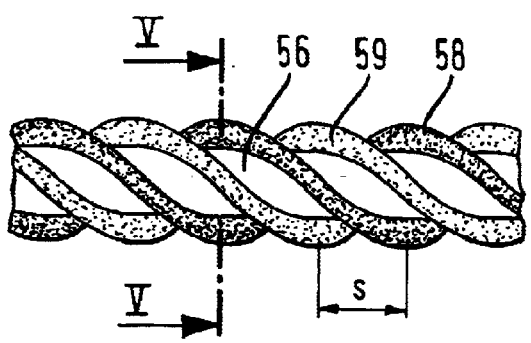
Figure 5:
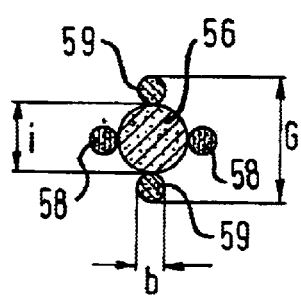
Figure 6:
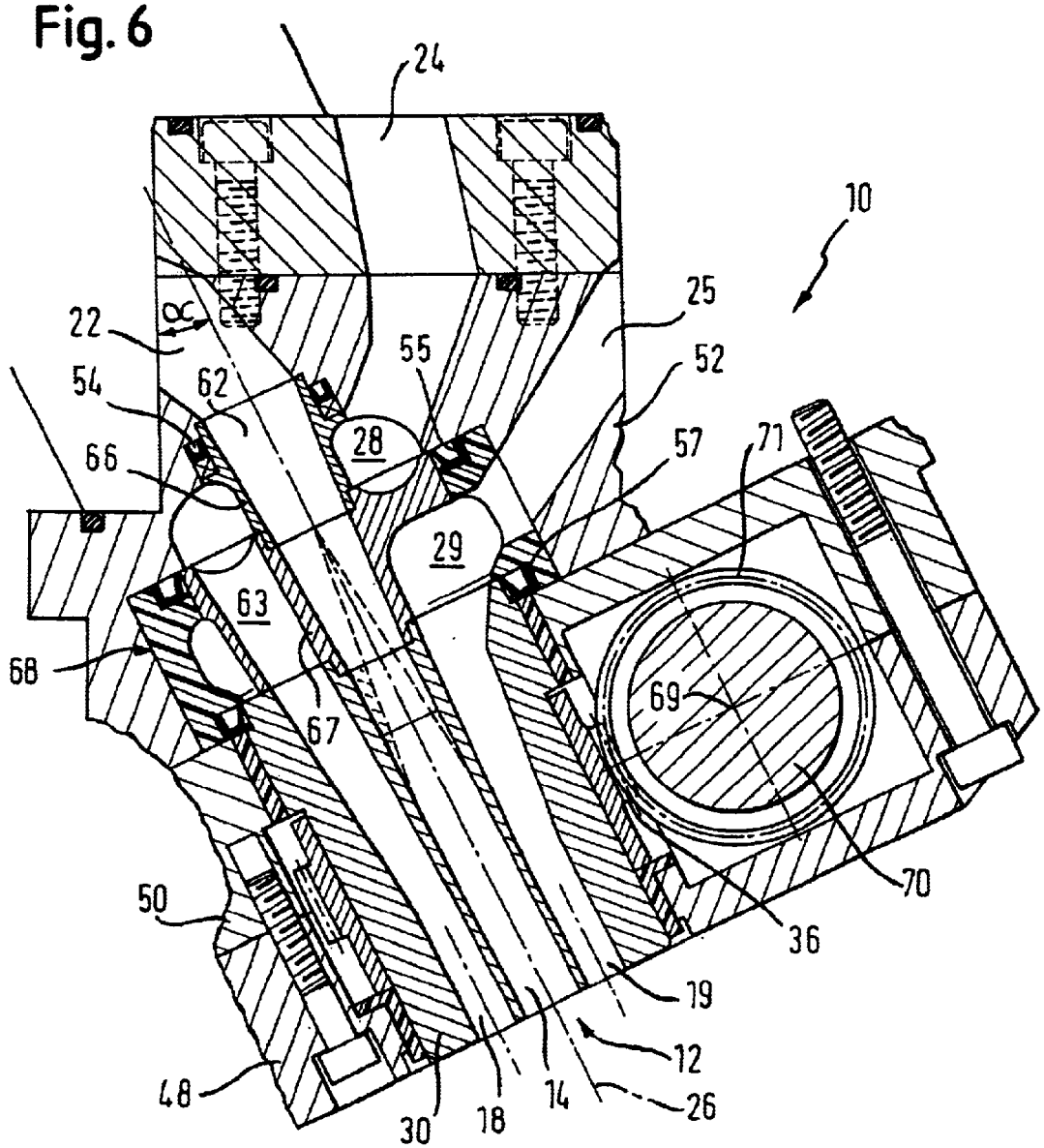
Figure 7:
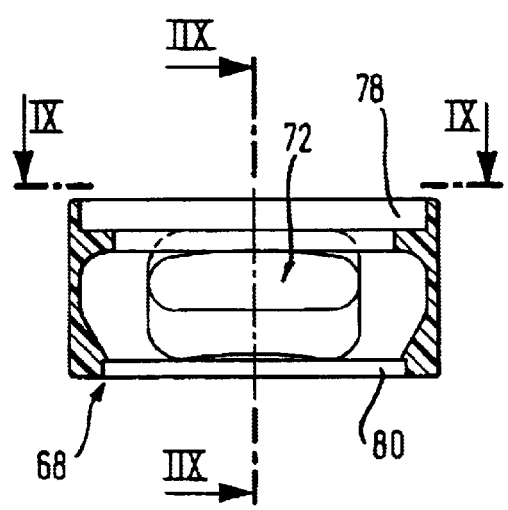
Figure 8:
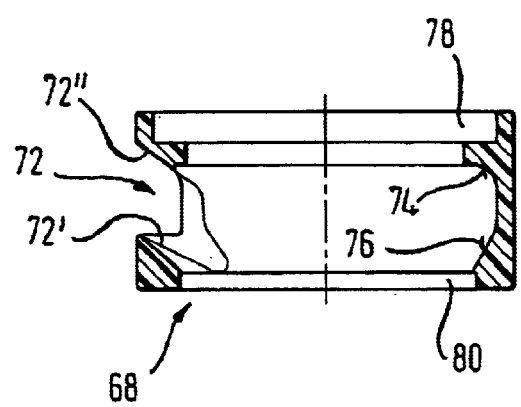
Figure 9:
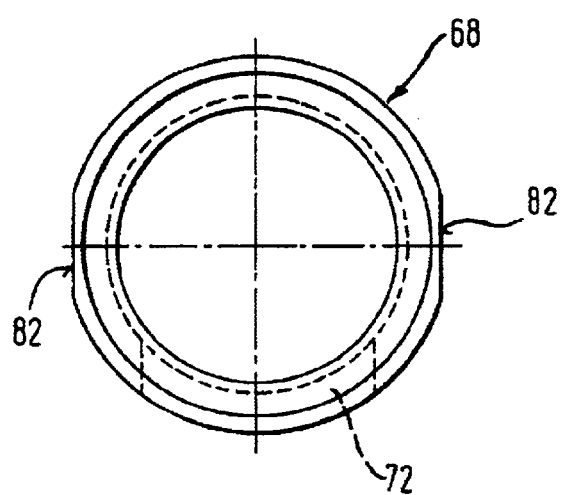

There now follows a detailed description of embodiments of nozzle arrangements according to the invention, nozzle carriers according to the invention and devices according to the invention for extruding doughy substances with reference to diagrammatic drawings. The drawings show:

FIG. 1 a first embodiment of a nozzle carrier according to the invention in longitudinal section, FIG. 2 a side view of a first example of a bakery product produced using the nozzle carrier shown in FIG. 1, FIG. 3 the cross section III—III in FIG. 2, FIG. 4 a side view of a second example of a bakery product produced using the nozzle arrangement shown in FIG. 1, FIG. 5 the cross section V—V in FIG. 4, FIG. 6 a second embodiment of a nozzle carrier according to the invention in longitudinal section, FIG. 7 a sectional front view of an annular insert according to the invention of a nozzle carrier shown in FIGS. 1 and 6, FIG. 8 the section denoted by IIX—IIX in FIG. 7, and FIG. 9 the plan view denoted by IX—IX in FIG. 7.

DETAILED DESCRIPTION OF THE PREFERRED EMBODIMENTS

FIG. 1 shows a first embodiment of a nozzle carrier 10 having a nozzle arrangement 12, which comprises an inner nozzle 14 with a mouth 16 and two outer nozzles 18 and 19 with a mouth 20 and 21 respectively. The nozzles are formed in a rotor, which is rotatable about an axis 26 of the inner nozzle 14. The two nozzles 18 and 19 extend parallel to the axis 26.

Formed in a stator are an inner feed channel 22, through which a first substance 56 is feedable to the inner nozzle 14. Two outer feed channels 24 and 25 lead to the two outer nozzles 18 and 19 respectively. During extrusion, three substances 56, 58 and 59 flow through the feed channels 22, 24 and 25 and are combined at the mouths 16, 20 and 21 of the nozzles 14, 18 and 19 into a bakery product.

During extrusion with said nozzle carrier 10 bakery products are produced, which comprise a middle strand of inner substance 56, around which are coiled strands of outer substance 58 and 59. In said case, the strands may be coiled in such a way that the inner substance 56 is either visible, as shown in FIGS. 2 and 4, or not visible.

By arranging two first and two second outer nozzles 18 and 19 around an inner nozzle 14 it is possible to produce a bakery product as shown in FIGS. 4 and 5. For said purpose, the outer nozzles 18 and 19 are disposed uniformly around the periphery of the inner nozzle and lie in pairs opposite one another. Examples of dimensions for such a bakery product are a diameter i of the inner strand of around 9 mm and a diameter b of an outer strand of around 4 mm. The result is bakery products having a total diameter G of around 17 mm and a pitch s of the coiled outer strands of around 8 mm to 12 mm.

The inner feed channel 22 is connected by a connection channel 62 in inserts 66 and 67 of the rotor to the inner nozzle 14. The first outer feed channel 24 is connected by an annular space 28 and a connection channel 63 in the insert 67 of the rotor to the first outer nozzle 18. The second outer feed channel 25 is connected by an annular space 29 to the second outer nozzle 19. The annular space 29 is formed in the inner region by the insert 67 and in the outer region by an annular insert 68, which is illustrated in FIGS. 7 to 9 and described in detail below.

The outer nozzles 18 and 19 are formed in a sleeve 30, which is rotatably supported and at the same time axially secured in two plain bearings 32 and 34. Formed on the sleeve 30 is an external tooth system 36, with which a toothed belt 38 is in mesh. The toothed belt 38 is supported by means of rollers 44 and 46, which are mounted in each case on a pin 40 and/or 42. The plain bearings 32 and 34 and the pins 40 and 42 are fastened to housing parts 48 and 50, which are screw-fastened to a housing part 52 of the stator. Thus, the sleeve 30 and the inserts 66 and 67 form a rotor, which is rotatable relative to a stator, wherein the stator comprises the housing parts 48, 50 and 52.

The rotor is sealed off relative to the stator by means of seals 54, 55 and 56. The seal 54 is disposed at the transition between the feed channel 22 and the insert 66. It is used both to seal the inner feed channel 22 in an outward direction and to seal off the annular space 28. The seal 55 is disposed between the annular space 28 and the annular space 29. Said seal 55 therefore effects sealing simultaneously between both annular spaces 28 and 29 and the stator and therefore performs a dual sealing function. The third seal 56 is disposed between the sleeve 30 and the annular space 29.

FIG. 6 shows a second embodiment of the nozzle arrangement 10, in which the sleeve 30 of the rotor having the nozzles 18 and 19 is drivable by means of a toothed gearing with intersecting axes 26 and 70. To said end, in the housing parts 48 and 50 a shaft 72 is rotatably supported, the axis 70 of which extends at right angles to and at a distance from the axis 26. The shaft 72 at its periphery lying opposite the external tooth system 36 has a tooth system 74, which meshes with the external tooth system 36. For example, both tooth systems 36 and 74 form a hypoid gear pair. The external tooth system 36 and the tooth system 74 may alternatively take the form of a bevel gear pair or worm gear pair.

In the embodiments shown in FIGS. 1 and 6 a plurality of nozzle arrangements 10 may be disposed side by side, in particular directly adjacent to one another. The axes 26 of the individual nozzle arrangements 10 are in said case disposed parallel to one another and the individual rotors are drivable by means of a common toothed belt 38 or a common shaft 72. By virtue of the synchronous rotation of the nozzle arrangements 10, during extrusion a plurality of identically coiled strands, e.g. upwards of thirty strands, are produced simultaneously.

FIGS. 1 and 6 also illustrate the manner of installation of the nozzle carrier in an extrusion device. The nozzle carrier and hence the axes of the nozzles 14, 18 and 19 are disposed so as to be inclined at an angle $\alpha$ of around 25° to the vertical. Thus, the substances flowing out encounter a conveyor belt (not shown), which carries them away, obliquely and the resulting deformation of the strand may be kept low.

FIGS. 7 to 9 show the annular insert 68. It comprises an inlet opening 70 for substance, which flows in from the feed channel 25. Two oblique inlet surfaces 72' and 72" formed in the, in relation to FIG. 8, top and bottom region of the inlet opening 70 direct the incoming substance in a downward direction. The substance flows into the annular space 29, which arises between the annular insert 68 installed in the stator and the insert 67 of the rotor. The top corner of said annular space 29, i.e. the, in relation to FIG. 8, top corner 74 in the annular insert 68, is rounded off so that in longitudinal section it is circular or elliptical in shape. The bottom side 76 of the annular space 29 and/or of the annular insert 68 is bevelled in a downward direction so that the inward flow direction of the substance initiated by the oblique inlet surfaces 72' and 72" is retained without major turbulence arising.

The annular insert 68 at the, in relation to FIGS. 7 and 8, top and bottom end moreover has annular shoulders 78 and 80, into which seals 55 and 56 are insertable.

To prevent rotation of the annular insert 68 inserted in the stator, said annular insert at its periphery has two flattened portion 82.

What is claimed is:

1. Nozzle carrier having a nozzle arrangement for extruding doughy substances, comprising
    an axis of rotation (26),
    an inner nozzle (14), which is disposed coaxially with said axis of rotation (26) and has a mouth (16) for extruding an inner substance (56), and
    two outer nozzles (18, 19), which are disposed axially offset relative to said inner nozzle (14) and are rotatable about said axis of rotation (26) and each have a mouth (20; 21) for extruding an outer substance (58, 59), wherein
    the nozzle carrier (10) comprises two parts, which are rotatable relative to one another, namely
    a stator, in which an inner feed channel (22) as well as a first (24) and a second outer feed channel (25) are formed, and
    a rotor, which carries the nozzles (14, 18, 19), is first rotatably supported in said stator and contains a first connection channel (62), which connects said inner feed channel (22) to said inner nozzle (14), characterized in that
    in at least one of the said parts, which are rotatable relative to one another, a first annular space (28) and in the rotor a second connection channel (63) are formed, which connect the first outer feed channel (24) to the first outer nozzle (18), and a second annular space (29) is 2. Nozzle carrier according to claim 1, characterized in that the rotor is sealed off relative to the stator by means of a first (54), second (55) and third seal (56), wherein the first seal (54) seals off the first feed channel (22), the first (54) and second seal (55) seal off the first annular space (28), and the second (55) and third seal (56) seal off the second annular space (29).

3. Nozzle carrier according to claim 1, characterized in that the annular space (28, 29) in longitudinal section is in sections circular or elliptical in shape.

4. Nozzle carrier according to claim 1, characterized in that the first annular space (28) is formed in an, in flow direction of the substance, top region by the stator and a first insert (66) of the rotor, and in a bottom region by a second insert (67) of the rotor.

5. Nozzle carrier according to claim 4, characterized in that the second annular space (29) is formed in its radially outer region by an annular insert (68) disposed in the stator and in its radially inner region by the second insert (67) of the rotor.

6. Nozzle carrier according to claim 4, characterized in that the first (62) and second connection channel (63) are formed by the first (66) and second insert (67) of the rotor.

7. Device for extruding doughy substances characterized in that at least one nozzle carrier according to one of claims 1 to 6 is provided and the rotor is drivable by means of a traction mechanism gearing, in particular a toothed belt drive (36, 38), or a toothed gearing (36, 72, 74) with intersecting axes (26, 69).

8. Device according to claim 7, characterized in that a plurality of nozzle carriers (10) are disposed side by side and drivable by means of a single traction means gearing, in particular a toothed belt drive (36, 38), or a single toothed gearing (36, 71, 74) with intersecting axes (26, 69).

9. Device according to claim 7, characterized in that each nozzle carrier (10) is disposed so as to be inclined at an angle α of around 25° to the vertical.

* * * * *